United States Patent [19]

Slotwinski

[11] Patent Number: 4,969,736
[45] Date of Patent: Nov. 13, 1990

[54] INTEGRATED FIBER OPTIC COUPLED PROXIMITY SENSOR FOR ROBOTIC END EFFECTORS AND TOOLS

[76] Inventor: Anthony R. Slotwinski, 10933 Harper's Square Ct., Reston, Va. 22091

[21] Appl. No.: 208,092

[22] Filed: Jun. 17, 1988

[51] Int. Cl.⁵ .............................................. G01B 9/02
[52] U.S. Cl. ..................................... 356/4.5; 356/358
[58] Field of Search ........................................ 356/4–5, 356/358

[56] References Cited

U.S. PATENT DOCUMENTS 4,533,247 8/1985 Epworth .......................... 356/358 X
4,596,466 6/1986 Ulrich .............................. 356/358 X
4,627,731 12/1986 Waters et al. ................... 356/358 X Primary Examiner—David L. Willis
Assistant Examiner—Matthew W. Koren
Attorney, Agent, or Firm—James R. Longacre; Michael L. Keller

[57] ABSTRACT

A system for measurement of a distance to a target. Light is emitted from a multi-mode laser and coupled to a sensor assembly. A portion of the light at the sensor assembly is reflected back into the fiber optic cable from which it came. The other portion of the light from the sensor assembly is projected towards the target. Light is reflected from the target and also connected into the optical cable as a target beam. The target beam and the reference beam then are connected through a path of variable length. When the target beam and the reference beam interface with one another, the path length is determined to be equal to the length to the target.

22 Claims, 3 Drawing Sheets

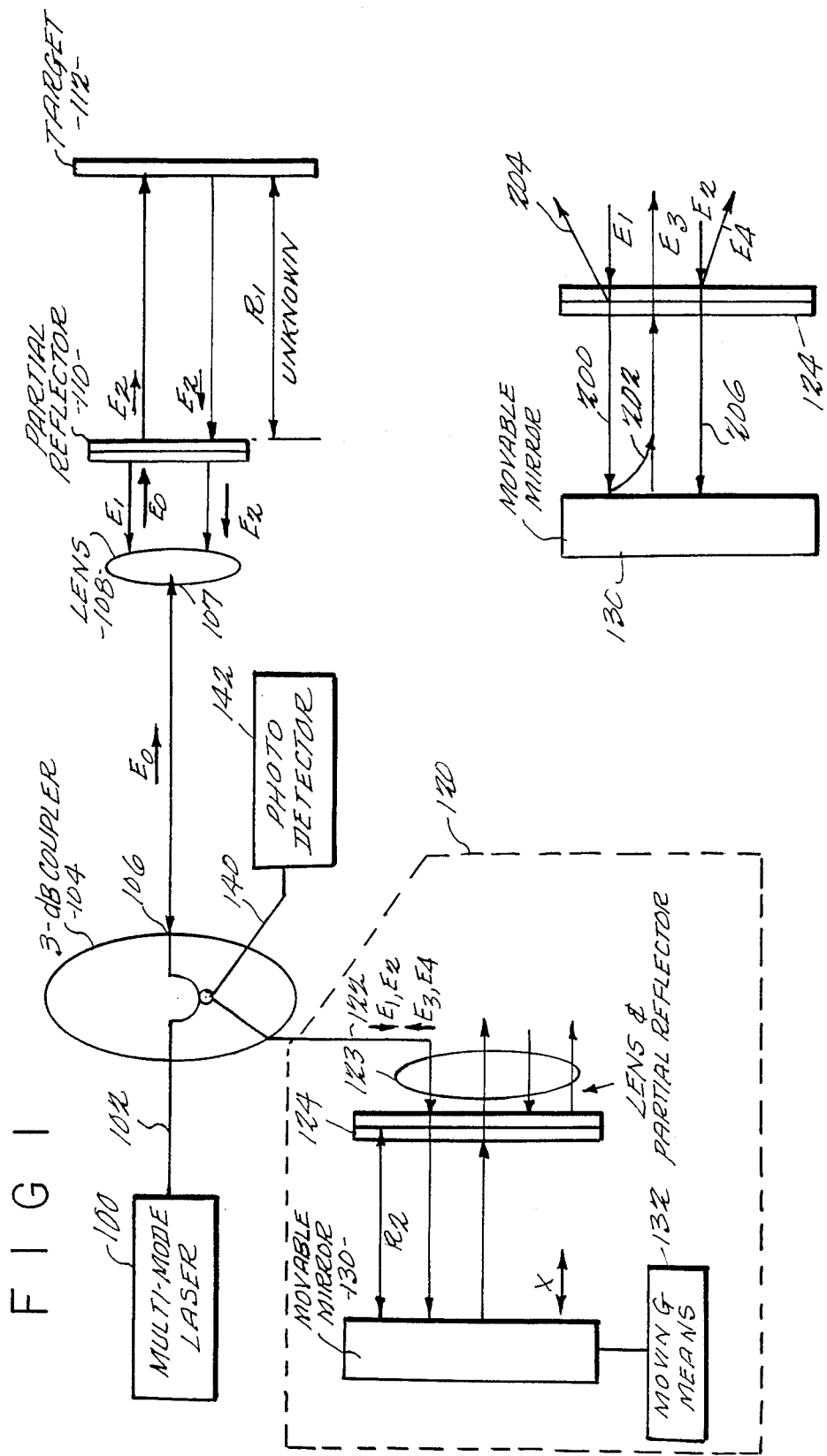

INTEGRATED FIBER OPTIC COUPLED PROXIMITY SENSOR FOR ROBOTIC END EFFECTORS AND TOOLS

BACKGROUND OF THE INVENTION

The present invention relates to a distance measuring system that uses multi-mode laser sources, reflected off a target, to determine a distance to the target. More specifically, the distance to the target is determined by use of a path length modulator as the distance when a maximum interference fringe is produced.

The measurement of distance have progressed a long way since the use of a tape measure. The use of such physical techniques are fine for measurement in mechanical structures. However, in the fields of robotics and other related fields, it is necessary to measure the distances to much more accuracy, and using more sophisticated techniques. One way in which the art has measured such distances is by use of optical techniques.

One such technique is disclosed U.S. application, now U.S. Pat. No. 4,830,486 Ser. No. 590,350 and relates to the use of a FM laser radar. However, this laser radar and other similar systems require a pure, single frequency diode laser that is modulated in frequency. The use of such a frequency tunable single frequency diode is disadvantageous, however, because they are expensive and hard to mass produce. Moreover, the presence of back reflected light significantly impedes the accuracy of such a system. The use of FM laser radar is also typically a chirped operation which also impedes the accuracy. Moreover, laser radar is very prone to environmental fluctuations. Laser radar also has a complexity typical of full scale radar processors which are typically expensive to produce. Laser radar systems such as described in U.S. Pat. No. 4,830,486 are extremely accurate and versatile systems, but are expensive and have these drawbacks.

Other techniques have been used in the art to optically determine distances, but all of these techniques are relatively disadvantageous as compared with the present invention. One such technique is described in U.S. Pat. No. 3,601,491. This system describes a distance measuring interferometer. Light from a laser 30 is split and sent to a reflector 14. Light is reflected from the reflector, and combined with a reference beam at the beam splitter. The movement of the retroreflector causes changes in the polarization plane of the linear depolarized light. However, this system requires relatively complicated processing in order to determine the movement of the retroreflector.

What has been needed in the art is a simple system which uses inexpensive and readily available lasers and has a minimum number of processing steps.

SUMMARY OF THE INVENTION

In order to overcome all of these problems and to produce a simple but accurate system, the present invention defines a system which measures the distance to a target. This system uses an incident light which is preferably from a multi-mode laser. A sensor assembly receives the incident light and projects this light towards a target. This sensor assembly also includes a partial reflector which reflects a portion of this light. The light is projected towards the target and reflected therefrom. The reflection of this light is then recollected by the sensor, and reinjected into the system. The light which is reflected by the partial reflector is called throughout the specification the "reference beam" and the light which is reflected from the target and refocused is herein called the target beam. Therefore, the target beam has traveled a distance further than the reference beam has traveled. This distance is two times the distance to the target.

The present invention utilizes this scenario by using some type of zero path length distance measuring means. The reference beam is caused to traverse a path length which is variable. When this variable path length is equal to the distance to the target, any known technique can be used to determine that the reference beam and the target beam now substantially coincide. According to the present invention, this is performed by the use of a moveable mirror with a lens/partial reflector system, or by a fiber modulator in the form of a Mach Zehnder interferometer.

According to another preferred embodiment of the invention, a plurality of laser sources are used which are mixed together. The mixed laser light approaches being wide band light. Furthermore, a plurality of sensors are used, each sensor directing a light beam towards a specific target. The distances to the target can be determined by either the use of a switch to determine one distance at a time, or by assuming that all distances are different, and determining distances one-by-one.

BRIEF DESCRIPTION OF THE DRAWINGS

These and other objects of the invention will be described with reference to the accompanying drawings wherein:

FIG. 1 shows a block diagram layout of a basic embodiment of the present invention;

FIG. 2 shows the specific reflection which occurs in the zero path length matching structure of FIG. 1;

DETAILED DESCRIPTION OF THE PREFERRED EMBODIMENT

Figure 3:
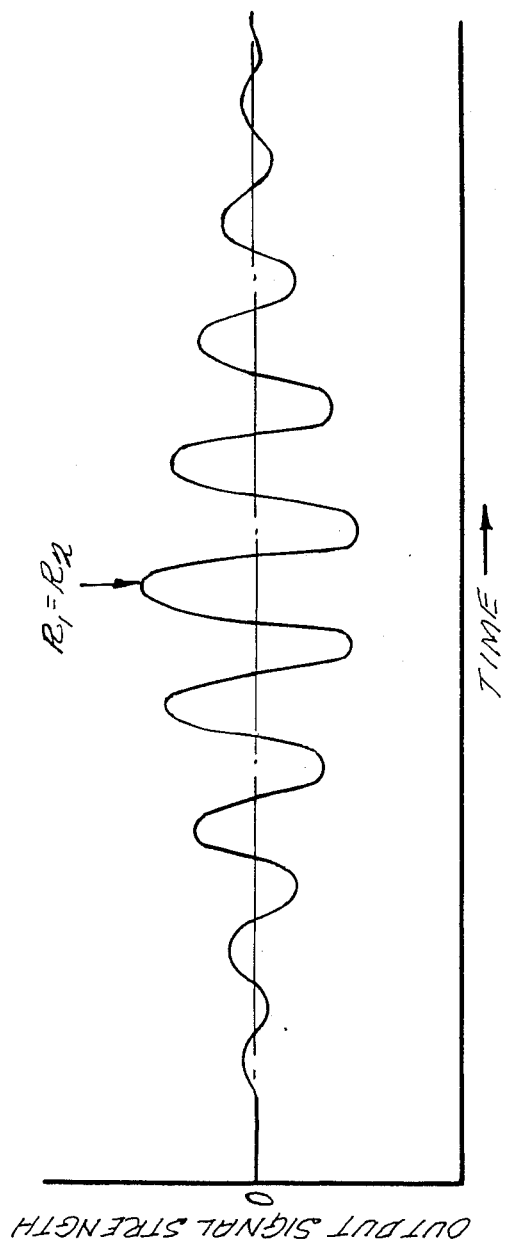
FIG. 3 shows an interference fringe which is detected by the photodetector 142 of FIG. 1.

The present invention will be described herein referring to the figures. FIG. 1 will be used to explain the techniques of the present invention.

FIG. 1 shows the basic concept of the operation of the present invention. A multi-mode laser source 100 is pigtailed onto a single mode optical fiber 102. Multi-mode laser source 100 can be a diode laser with a multi-mode spectral output, or alternatively can be a super luminescent diode. Two mW or more of optical power can be transmitted into the fiber using commercially available devices. Moreover, such devices are uneffected by backscattered light.

Fiber 102 is fused to a single mode fiber optic 3dB coupler 104. One output arm of the coupler 106 is directed towards the measurement area of interest and carries a light beam $E_0$ from laser 100. The measurement area of interest includes a target 112. The fiber attached to arm 106 carries the multi-mode spectral output $E_0$ from multi-mode laser 100 to lens 108 where this output $E_0$ is focused. Lens 108 can be any suitable focusing lens. A partially reflecting surface 110 is also used, either on the fiber end 107 or on the focusing optics 108 themselves. This partial reflector is shown herein as a separate partial reflector 110, it being understood that this could alternately be a reflecting surface. Partial reflector 110 reflects back part of the laser beam towards lens 108. The part of beam $E_0$ which is reflected back by partial reflector 110 is labelled herein as $E_1$ and is called the reference beam. The part of beam $E_0$ which is transmitted through partial reflector 110 is labelled $E_2$ and called the target beam. $E_2$, which is now a focused beam, is sent to target 112. At least part of this beam will be reflected back from target 112, still labelled as beam $E_2$. This beam is then recollected by lens 108 and transmitted onto the fiber towards arm 106.

The distance to the target is the parameter desired to be obtained. This distance is labelled herein as $R_1$. Therefore, there are two wavefronts in the fiber 106 traveling in the reverse direction to beam $E_0$. One of these wavefronts (the target beam $E_2$) has traveled a distance to $2R_1$ greater than the other. Since the coherence length of the laser is much less than the unknown range $R_1$, interference will not occur between $E_1$ and $E_2$. This is because $R_1$ (the distance to the target) will certainly be much greater than 200 micrometers, which is a typical coherence length of multi-mode laser 100. Therefore, the two wavefronts travel back through the coupler 104 to the reference section 120.

The wavefronts on fiber 106 travel back through 3dB coupler 104 to fiber 122. The wavefronts on fiber 122 at this time include the reference and target beams, $E_1$ and $E_2$. These signals are coupled to lens 123 and partial reflector 124, which is similar to the device 108 and 110.

Each of beams $E_1$ and $E_2$ have a part thereof which is transmitted through the lens/partial reflector 123/124 and a part thereof which is reflected thereby. The waves which pass through lens/partial reflector 123/124 are directed towards a movable mirror 130. This mirror can be any means for reflecting, including a flat or shaped mirror, a corner cube prism, a retroreflector, a cat's eye reflector or a phase conjugate mirror. This mirror can be moved in the direction labelled as X by a moving means 132. The distance between the output of the lens/partial reflector 124 and movable mirror 130 is defined as a distance $R_2$. The beam which is reflected from moving mirror 130 is then passed back to lens/partial reflector 123/124, recollected thereby, and again sent to 3dB coupler 104.

The moving means 132 can be any kind of position actuator such as a motorized micrometer or a cam arrangement.

The beams in reference section 120 will now be explained herein in FIG. 2. Wave $E_1$ is shown incident on lens/partial reflector. A part of wave $E_1$ labelled 200 passes lens/partial reflector 124 while the remaining part 204 is reflected thereby. We are not concerned with this reflected portion 204 in this embodiment. Wave 200 then travels towards movable mirror 130 where it is reflected thereby. The reflected wave 202 is labelled herewith as $E_3$. Wave $E_3$ returns to the partial reflector 124 and is recollected by the lens optics 124 thereof.

The wave $E_2$ is also shown incident on lens partial reflector 124. A first part 206 is transmitted therethrough towards the movable mirror. However, we are not concerned with this portion 206. The remaining part is reflected, and is referred herein as a wave $E_4$.

As discussed previously, the wave $E_2$ has traveled an extra distance $2R_1$ as compared with the wave $E_1$. Therefore, if the wave $E_1$ travels to the moving mirror and back, the wave $E_1$ (now labeled $E_3$) will have traveled an extra distance defined by this distance to the mirror and back ($2R_2$). As such, when $E_3$ is exactly equal to $E_4$ (the reflection of $E_2$), the distance $R_1$ can be determined to be equal to the distance $R_2$. Therefore, we can determine when $R_1$ equals $R_2$ by determining a maximum of any interference between $E_3$ and $E_4$. The waves $E_3$ and $E_4$ are connected through 3dB coupler 104 to fiber 140, where they are coupled to a photodetector 142. This photodetector 142 can be any kind of signal processor. As the mirror is translated in the reference arm, the output of the detector will represent the autocorrelation of the two signals.

It can therefore be determined when $R_1$ equals $R_2$ using this system.

FIG. 3 shows the output of the autocorrelation function. When $R_1$ equals $R_2$, the maximum of this function occurs. Moreover, if the speed and position of the translating mirror 130 is known, then the time axis in FIG. 3 can be converted to a position axis, with the center of the interference pattern being the point where $R_2$ equals $R_1$. The width of the pattern can then be ½ of the laser coherence length. By merely determining the position of the pattern, the position of the target can also be found to within 100 μm or 4 mils. By determining the center of the pattern to with one cycle, the position is known to within one wavelength of the light source.

If the translation speed follows a linear function, moreover, then the pattern will have one frequency. The signal processor can then use appropriate filters to remove the signals from any noise which is present. The speed of this measurement system is directly proportional to the speed of the translating mirror, and inversely proportional to a depth of range that is required.

Moreover, since both interfering wavefronts travel on the same fiber at virtually the same time, perturbations in the outside environments on the optical fiber have no effect on the signal. Therefore this system obviates any need to temperature control the fiber or to use a polarization preserving structure. The reference section does need to be kept in alignment and protected from the environment, but this is only a small portion of the entire system. Everything can be placed in an instrument box with the fiber sensor lead traveling to the measurement site.

Other modifications are possible in this basic system which will be briefly discussed herein. It is possible to multiplex several sensors and several lasers together. The multi-mode laser 100 would then include a plurality of lasers, and the lens/partial reflector would include a plurality of such structures. A plurality of different measurements, corresponding to the plurality of different distances could then be obtained as long these different distances were not the same as one another. The moving mirror could be translated over the plurality of distances to obtain a plurality of different output signals from the detector at different times. Moreover, this has the unexpected effect of improving the system. It has been experimentally found that the wider the laser spectra, the narrower the detected pattern, making the system inherently more accurate. Therefore, this system produces extra accuracy.

Another modification to this system is more basic, and involves replacing the reference section 120 and photodetector 142 with a fiber modulator incorporated into a Mach Zehnder interferometer and electronics. Such a second way of operating this system is discussed in more detail with reference to the preferred embodiment of FIG. 4.

Figure 4:
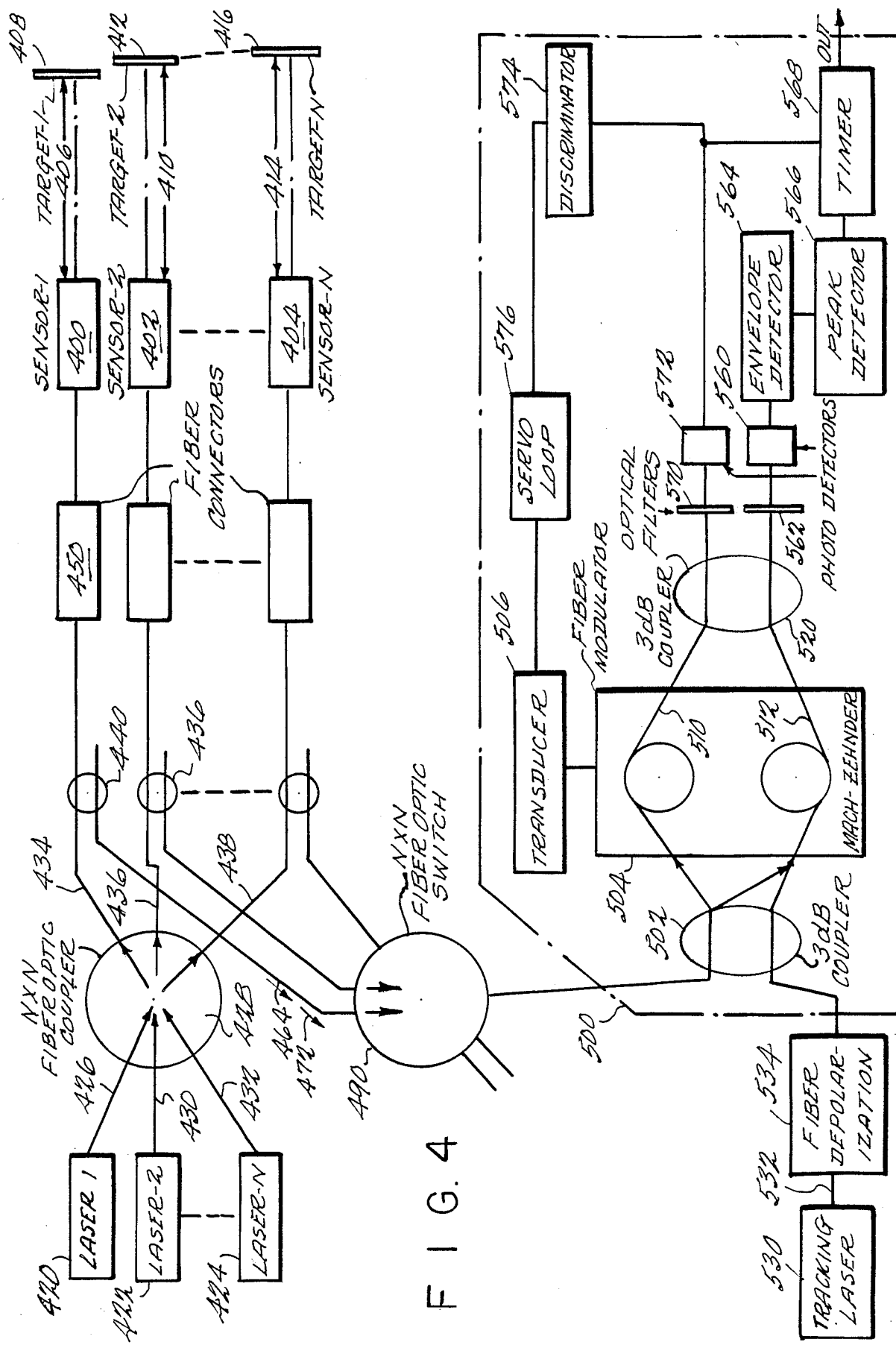
FIG. 4 shows an embodiment of the invention which uses a plurality of lasers and a plurality of sensors, and uses a fiber modulator to determine the path length difference.

Having explained the basic configuration of the system, the preferred embodiment of the invention will now be described. A block diagram of this preferred embodiment is shown in FIG. 4. FIG. 4 shows a number N of sensor elements 400, 402 and 404. Each sensor element has an associated target, the distance to which will be gauged by the sensor element. Sensor 400 gauges the distance 406 to target 408. Similarly, sensor 402 gauges the distance 410 to target 412 and sensor 404 gauges the distance 414 to target 416. There are also a corresponding number of multi-mode lasers labelled as 420, 422 and 424. Each laser is pigtailed to a single mode fiber such as 426, and each single mode fiber is mixed together in a N by N single mode fiber coupler 428. This coupler has N inputs from single mode fibers 426, 430 and 432, and N outputs on single mode fibers 434, 436 and 438. The path which each fiber follows is the same, so only path 434 will be discussed in detail herewith.

Fiber 434 is connected through a 3dB fiber optic coupler 440 to a fiber optic connector 450. Connector 450 is connected to sensor 400 to measure the distance to target 408.

Figure 5:
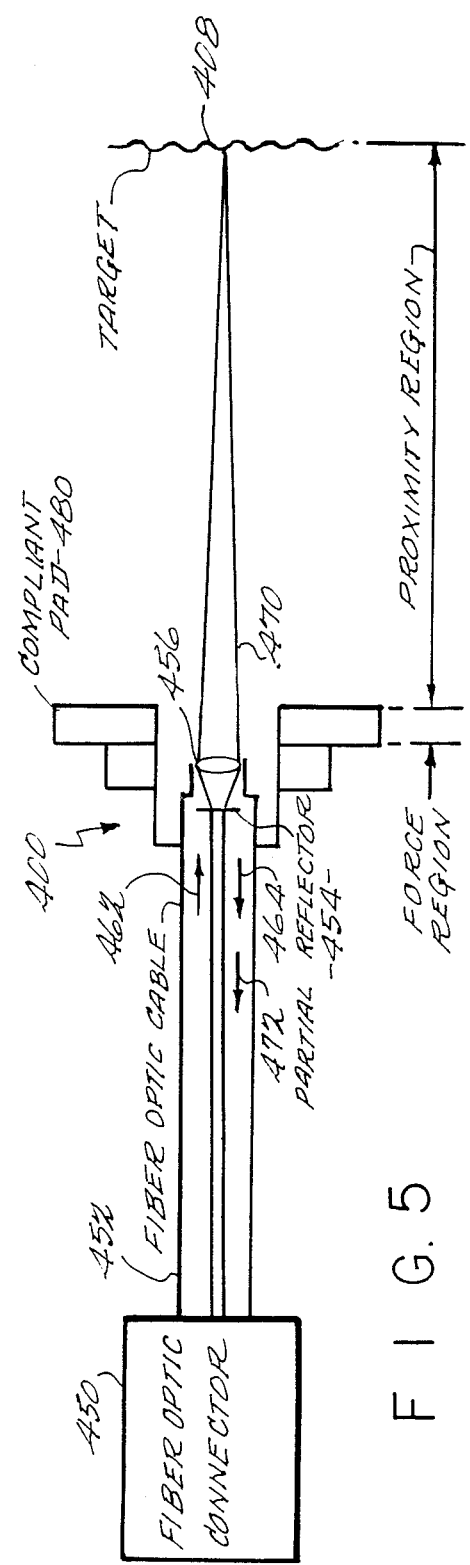
FIG. 5 shows a detailed layout of the sensor assembly according to a preferred embodiment of this invention.

The connector and sensor is shown in more detail in FIG. 5. FIG. 5 shows fiber optic connector 450 connected to a length of fiber optic cable 452 and to sensor 400. As the light exits fiber optic cable 452, a portion of the light beam is reflected by particle reflector 454. The other portion of the light beam is focused by lens assembly 456. The reflector can be a dielectric coating or merely a reflection at the glass/air interface. This reflected beam becomes the reference beam, and is reflected back into the fiber end face. Therefore, the light beam shown as 462 is partially reflected back as reference beam 464, and the other portion thereof is focused as beam 468. The reflection of 468 returns as 470, which is focused as beam 472.

This reinjected focused beam becomes the target beam 472.

The preferred embodiment of this invention also includes a mechanical housing including pressure sensitive compliant pad 480. The surface of this compliant pad outward comprises the proximity region beyond which the distance is measured. A force can also be calculated from the deflection of this compliant pad.

Light from reference beam 464 and target beam 472 are transferred through the fiber optic connector and 3dB coupler 440 to an N by N single mode fiber optic switch 490. This switch is provided for the purpose of allowing each sensor to be individually queried, if desired. The selected beams pass through fiber optic switch 490 to zero path length measurement system 500. This system has the function of determining a path length difference between the reference beam 464 and the target beam 472. In this preferred embodiment, the path length is determined using a fiber modulator to determine a length which causes the reference beam to match the target beam.

The input of zero path length matching device 500 includes another 3dB coupler 502. The output port of the 3dB coupler 502 is connected to a Mach Zehnder interferometer 504. Such interferometers are known in the art, and this particular interferometer acts as the fiber modulator. Each arm is matched in length and contains a length of fiber nominally 1,000 times that of the largest distance range that will be expected. A transducer 506 is used in a mechanical push-pull configuration to change the relative optical path length between the two arms 510 and 512 of the interferometer.

As the fiber arms are modulated through the zero optical path length difference point, the input beam will mix with itself at the output 3dB coupler 520 of the system. As the arms are modulated through the point where the optical path length difference is equal to the target range, the reference beam 464 mixes with the target beam 472 to produce an interference pattern, which is translated into a target pulse. A detector is used to follow this target pulse.

In order to track the optical path length modulation in the interferometer and to linearize the modulation, a single mode tracking laser 530 may also be used. This single mode tracking laser is pigtailed onto a single mode fiber 532, and may or may not include fiber depolarizer 534. This laser has a different wavelength than the source lasers and have a coherence length sufficient to cover the expected system range. The tracking output is filtered by optical filter 570 and detected by detector 572. This output is feed to a discriminator 574 and through a servo loop 576 to control transducer 506 and to timer 568. Timer 568 counts the interference fringes, to produce a clock. In this way, the transducer 506 can be accurately controlled and the exact range can be calculated.

The target pulse output of the Mach Zehnder interferometer, between the path adjusted reference and target are detected by photodetector 560 having been filtered by filter 562. This detector 560 passes through an envelope detector 564, through a peak detector 566 and finally to a timer 568. Timer 568 counts the interference fringes.

System performance depends upon many factors including transmitted optical power, system optical losses, range depth, receiver design, etc. As an example of typical performance characteristics, the following system parameters were choosen:

| Antenna Lens Aperture | $d = 1$ mm |
| --- | --- |
| Sensor Range | $R = 0$ to $0.5$ m |
| Focus Set Point | $R_F = 0.25$ m |
| Time per Measurement | $T = 0.1$ sec |
| Target Reflectivity | $P_o = 10\%$ |
| Transmitter Power (per laser) | $P_t = 1 \times 10^{-3}$ W |
| Sensor Head Partial Reflectivity | $P_s = 10\%$ |
| Local Oscillator System Loss | $L_{LO} = -22$ dB |
| Signal System Loss | $L_s = -13$ dB |
| Defocusing Loss | $L_D = 0$ to $26$ dB |

The optical system signal-to-noise ratio (S/N) is given by:

$$\frac{S}{N} = \frac{P_S P_{LO}}{NEP}$$

where $$P_{LO} = P_t L_{LO} = 6.3 \times 10^{-6} W$$

$$P_{smin} = P_t L_s P_o \frac{d^2}{R_f^2} L_{Dmax} = 2.0 \times 10^{-14} W$$

$$NEP = 1.5 \times 10^{-25} B \ (APD \text{ with Gain } - 100)$$

$$B = 100 \text{ KHz} \frac{1}{\tau} \text{ (where } \tau = \text{ expected signal duration)}$$

$$\frac{S}{N_{min}} = 85 = 19.3 \, dB$$

It should be noted that trade-offs can be made between antenna lens aperture, sensor range, measurement time, and optical receiver design to optimize the total system performance.

The expected measurement accuracy and resolution depends on many factors including the signal strength, effective coherence length of the combined optical sources, measurement time, sensor range, and fiber modulation linearity. For a range of 0.5 m, a measurement time of 0.1 sec, and effective coherence length of 0.05 mm and a highly linear modulation, the coherent signal duration is given by:

$$T = \frac{0.1 \, sec}{500 \, mm} (.05 \, mm) = 1 \times 10^{-5} \, sec$$

By merely detecting the presence of the signal pulse, a minimum resolution of ±0.05 mm is assured.

System accuracy depends, in part, on the frequency stability of the tracking laser diode. Assuming a 1300 nm laser with a drift of ±10 nm, the accuracy will be ±

$$\frac{10}{1300} = \pm 0.77\%$$

of the measurement reading. This is ±3.8 mm for a of 0.5 m. For a resolution of ±0.05 mm, the accuracy is equal to the resolution at a range of 6.5 mm or less. For more stringent accuracy requirements, a second feedback loop employing a fiber optic Mach Zehnder reference arm can be used to control the frequency of the tracking laser.

Although only a few embodiments have been discussed above, those having ordinary skill in the art will certainly understand that many modifications are possible in the preferred embodiment without materially departing from the advantages of the present invention. For instance, although the fiber modulator has been described as being a Mach Zehnder interferometer, any other kind of fiber modulator or other kind of interferometer could be used. The N by N fiber optic switches in the preferred embodiment are not necessary, and a sequential operation between the various distances could be made. The preferred embodiment is shown with a number of lasers, although any number of lasers including one laser could similarly be used. Moreover, the laser can be any kind of multimode laser or could even be a super luminescent diode.

All such modifications are intended to be encompassed within the following claims.

What is claimed is:

1. A system for measurement of a distance to a target, comprising:
   means for emitting incident light having predetermined characteristics;
   a sensor assembly, optically coupled to receive said incident light, and including:
   (a) means for projecting said incident light towards the target and receiving a reflection thereof as a target light beam, and
   (b) means for reflecting a portion of said incident light before said projecting as a reference light beam; and
   zero path length matching means, coupled to receive said target and reference light beams from said sensor assembly for determining a path length which causes said reference light beam to substantially coincide with said target light beam.

2. A system as in claim 1 wherein said means for emitting light is a multi-mode laser.

3. A system as in claim 2 wherein said sensor assembly is a lens with a partial reflector.

4. A system as in claim 1 wherein said zero path length matching means includes means for determining a location of a coherence peak.

5. A system for measurement of a distance to a target, comprising:
   means for emitting incident light having predetermined characteristics;
   a sensor assembly, optically coupled to receive said incident light, and including:
   (a) means for projecting said incident light towards the target and receiving a reflection thereof as a target light beam, and
   (b) means for reflecting a portion of said incident light before said projecting as a reference light beam; and
   zero path length matching means, coupled to receive said target and reference light beams from said sensor assembly for determining a path length which causes said reference light beam to substantially coincide with said target light beam wherein said lens is formed of glass, and said partial reflector is formed by the reflection which occurs at the glass/air interface.

6. A system for measurement of a distance to a target, comprising:
   means for emitting incident light having predetermined characteristics;
   a sensor assembly, optically coupled to receive said incident light, and including:
   (a) means for projecting said incident light towards the target and receiving a reflection thereof as a target light beam, and
   (b) means for reflecting a portion of said incident light before said projecting as a reference light beam; and
   zero path length matching means, coupled to receive said target and reference light beam from said sensor assembly for determining a path length which causes said reference light beam to substantially coincide with said target light beam wherein said zero path length matching means comprises:
   a second sensor assembly including a lens/partial reflector system disposed to receive input light beam including said target beam and said reference beam from said zero path length matching means, which partially reflects a portion of said input light and passes a portion of said input light;
   a movable mirror disposed to receive and reflect light passed by said second sensor assembly; and
   means for detecting interference fringes between a reflection from said movable mirror of said reference bean and said partial reflection from said second lens/partial reflector system of said target beam.

7. A system as in claim 6 wherein said movable mirror comprises a mirror and means for moving said mirror.

8. A system as in claim 7 wherein said zero path length matching means further comprises a photo detector and means for processing an output of said photodetector.

9. A system as in claim 8 wherein said means for emitting light comprises a plurality of multi-mode lasers and wherein said sensor assembly comprises a plurality of said means for projecting and a plurality of said means for reflecting.

10. A system as in claim 6 wherein said mirror is a structure from the group consisting of a flat mirror, a shaped mirror, a corner cube prism, a retroreflector, a cat's eye reflector, or a phase conjugate mirror.

11. A system for measurement of a distance to a target, comprising:
 means for emitting incident light having predetermined characteristics;
 a sensor assembly, optically coupled to receive said incident light, and including:
  (a) means for projecting said incident light towards the target and receiving a reflection thereof as a target light beam, and
  (b) means for reflecting a portion of said incident light before said projecting as a reference light beam; and
 zero path length matching means, coupled to receive said target and reference light beams from said sensor assembly for determining a path length which causes said reference light beam to substantially coincide with said target light beam, wherein said zero path length matching means comprises a Mach Zehnder interferometer.

12. A system as in claim 11 wherein said means for emitting light comprises a plurality of multi-mode lasers, and wherein said sensor assembly comprises a plurality of said means for projecting and a plurality of said means for reflecting.

13. A system for measurement of a distance to a target, comprising:
 a plurality of multi-mode laser sources;
 means for mixing outputs of said plurality of laser sources to provide a mixed output;
 a plurality of sensor means, each receiving said mixed output of said plurality of laser sources, each said sensor means for:
  (a) reflecting a portion of said mixed output as a reference beam; and
  (b) projecting a second portion of said mixed output towards a target and receiving a projection thereof as a target beam; and
 zero path length matching means, coupled to receive said target beam and said reference beam, for determining a path length which causes said target beam and said reference beam to substantially coincide.

14. A system as in claim 13 further comprising an N-by-N optical switch, coupled to receive said reference and target beams from each of said sensor means, for selectively producing an output corresponding to one of its inputs.

15. A system as in claim 13 further comprising an optical coupler at an input of said zero path length matching means, having one input connected to receive said target and reference beams, and having another input; and
 a tracking laser, for producing a single mode beam, coupled to said another input of said optical coupler.

16. A system as in claim 13 wherein said zero path length matching means comprises:
 a lens/partial reflector system which partially reflects a portion of its input light and passes a portion of the input light, coupled to receive said target beam and said reference beam;
 a movable mirror disposed to receive light reflected by said lens/partial reflector system; and
 means for detecting interference fringes between a reflection from said movable mirror of said target beam and said partial reflection of said reference beam.

17. A system as in claim 13 wherein said zero path length matching means is a fiber modulator formed of a Mach Zehnder interferometer.

18. A method of measuring a distance to a target, comprising the steps of:
 producing an incident light;
 projecting said incident light towards the target and receiving a reflection thereof as a target beam;
 reflecting a portion of said incident light before said projecting to produce a reference beam;
 coupling said target beam and said reference beam through paths of different and variable lengths;
 varying said length of said path; and
 determining an extra path length through which said reference beam has traveled, when said reference beam and said target beam substantially coincide.

19. A method as in claim 18 wherein said determining step detects an interference fringe between said target beam and said reference beam.

20. A method as in claim 18 wherein said determining step includes the step of determining a location of a coherence peak.

21. A system for measurement of a distance to a target, comprising:
 means for emitting incident light having predetermined characteristics;
 a sensor assembly, optically coupled to receive said incident light, and including:
  (a) means for projecting said incident light towards the target and receiving a reflection thereof as a target light beam, and
  (b) means for reflecting a portion of said incident light before said projecting as a reference light beam;
 zero path length matching means, coupled to receive said target and reference light beams from said sensor assembly for determining a path length which causes said reference light beam to substantially coincide with said target light beam; and
 means, coupled to said sensor assembly, for detecting a pressure which said sensor exerts on an object.

22. A system as in claim 21 wherein said sensor detecting means is a complaint pad.

* * * * *